United States Patent
Lindeberg et al.

(10) Patent No.: US 7,777,470 B2
(45) Date of Patent: Aug. 17, 2010

(54) SYSTEM AND METHOD FOR CONTROLLING A HYSTERETIC MODE CONVERTER

(75) Inventors: Jonne Jalmar Sebastian Lindeberg, Helsinki (FI); George Vincent Konnail, Dallas, TX (US); Stepan Iliasevitch, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 332 days.

(21) Appl. No.: 11/951,704

(22) Filed: Dec. 6, 2007
(Under 37 CFR 1.47)

(65) Prior Publication Data

US 2008/0252278 A1   Oct. 16, 2008

Related U.S. Application Data

(60) Provisional application No. 60/868,820, filed on Dec. 6, 2006, provisional application No. 60/974,645, filed on Sep. 24, 2007.

(51) Int. Cl.
  *G05F 1/575* (2006.01)
(52) U.S. Cl. ..................................... 323/283
(58) Field of Classification Search .................. 323/282, 323/283, 284, 285, 351
See application file for complete search history.

(56) References Cited

U.S. PATENT DOCUMENTS

| | | | |
|---|---|---|---|
| 4,929,882 A | 5/1990 | Szepesi | |
| 5,260,861 A | 11/1993 | Wert | |
| 5,548,206 A | 8/1996 | Soo | |
| 5,811,999 A | 9/1998 | Hall et al. | |
| 5,912,552 A | 6/1999 | Tateishi | |
| 5,943,227 A | 8/1999 | Bryson et al. | |
| 6,147,478 A | 11/2000 | Skelton et al. | |
| 6,348,780 B1 * | 2/2002 | Grant | .................. 323/222 |
| 6,747,444 B2 | 6/2004 | Balakrishnan et al. | |

* cited by examiner

*Primary Examiner*—Gary L Laxton
(74) *Attorney, Agent, or Firm*—William B. Kempler; Wade J. Brady, III; Frederick J. Telecky, Jr.

(57) ABSTRACT

A system and method for controlling a conversion frequency of a hysteretic mode voltage converter. A digital control loop comprises a timing measure unit having a first input coupled to a reference clock and a second input coupled to a clock based on a switching of the switching of the converter, and an on time adjust unit coupled to the timing measure unit. The timing measure unit counts a number of clock ticks of a clock signal provided by the clock occurring during a period of time specified by a number of clock ticks of a reference clock signal provided by the reference clock. The on time adjust unit adjusts an on time control signal based on the count of the number of clock ticks of the clock signal to alter a frequency of the switching.

19 Claims, 3 Drawing Sheets

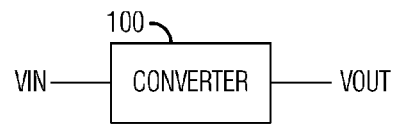
Fig. 1
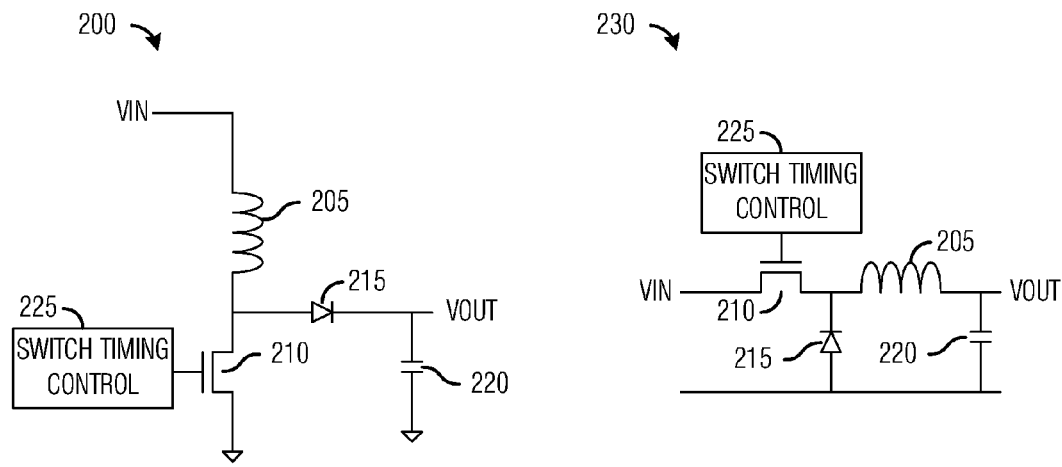
Fig. 2a
Fig. 2b
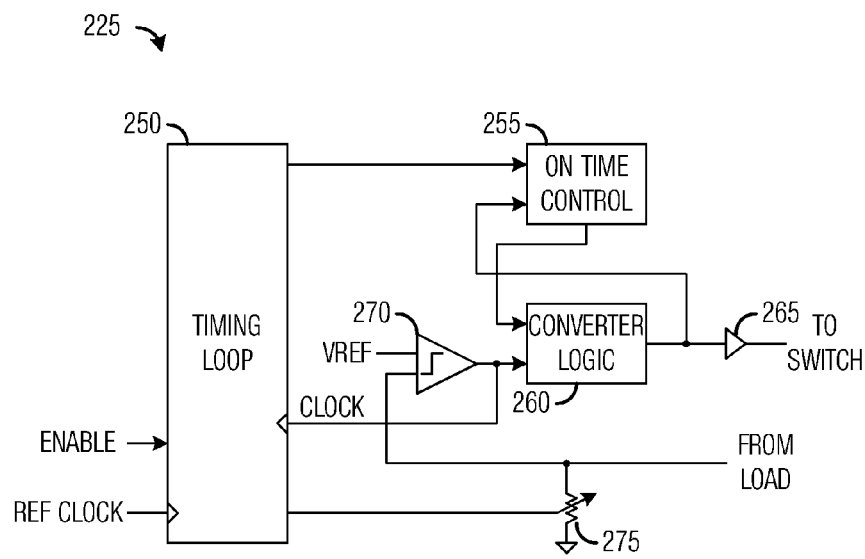
Fig. 2c

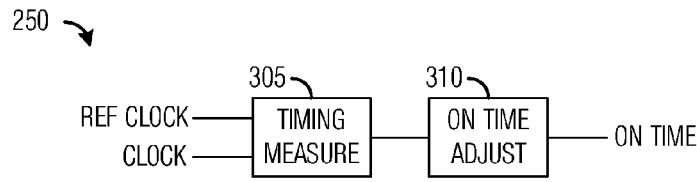
*Fig. 3a*
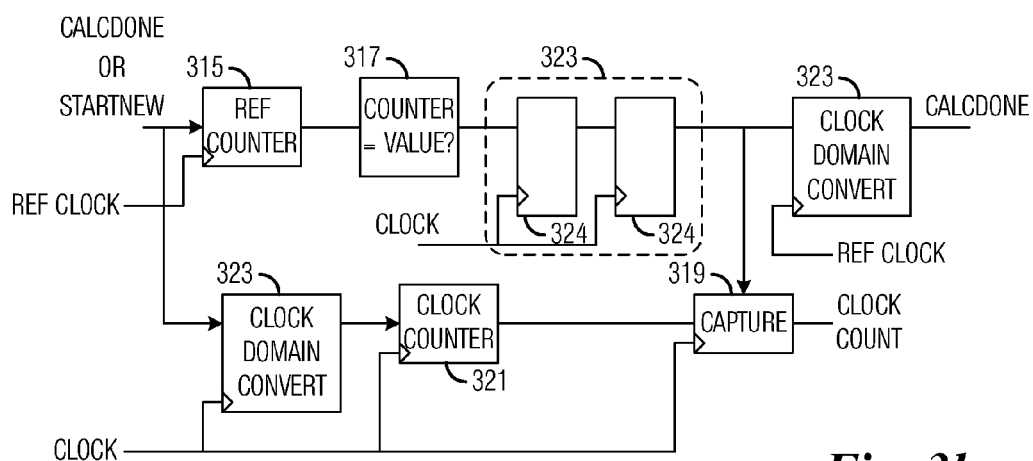
*Fig. 3b*
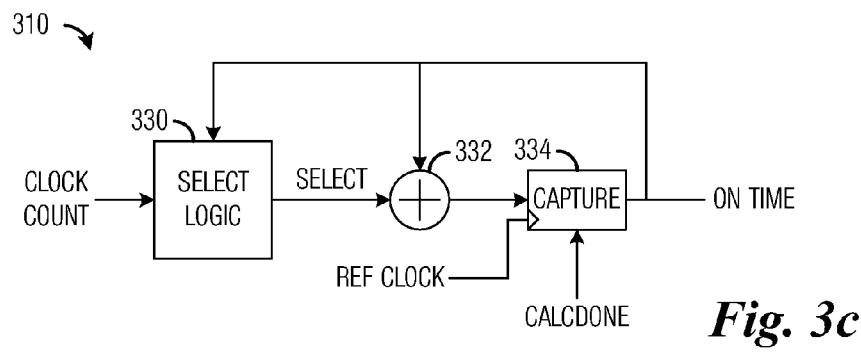
*Fig. 3c*
| CLOCK COUNT | ON TIME | SELECT |
|---|---|---|
| > HIGH THLD | < MAX_TIME | = +M |
| < LOW THLD | > MIN_TIME | = -M |
| > LOW THLD & < HIGH THLD | | = 0 |
*Fig. 3d*

SYSTEM AND METHOD FOR CONTROLLING A HYSTERETIC MODE CONVERTER

This application claims the benefit of U.S. Provisional Application No. 60/868,820, filed on Dec. 6, 2006, entitled "Digital Control for Hysteretic Converter," and also claims the benefit of U.S. Provisional Application No. 60/974,645, filed on Sep. 24, 2007, entitled "System and Method for Controlling a Hysteretic Mode Converter," which applications are hereby incorporated herein by reference.

TECHNICAL FIELD

The present invention relates generally to a system and method for voltage conversion, and more particularly to a system and method for controlling a conversion frequency of a hysteretic mode voltage converter.

BACKGROUND

In modern day electronics, a single electronic device may require multiple forms of electrical power, such as alternating current and direct current. Additionally, the electronic device may make use of several different voltage levels. For example, in a personal computer, there may be a need for +3.3 V, −5 V, +5 V, and +12 V to provide different circuits in the personal computer with required power. Similarly, in a portable electronic device powered by a battery source, there is often a need to provide voltage levels that differ from the voltage level of the battery source. Furthermore, the voltage level of the battery source may decrease as the battery source discharges, while the circuitry in the portable electronic device may typically require a constant voltage level.

The conversion of electrical power from a first voltage level to a second voltage level may introduce an unwanted frequency component in the power signal at the second voltage level. The unwanted frequency component may be related to the switching frequency of the voltage converter. In some cases, the switching frequency may negatively affect the operation of the electronic device. For example, in portable communications devices, there are certain frequencies that manifest in the form of audible noise. Therefore, it is desirable that the switching frequency of the voltage converter and its harmonics should not lie within these frequencies. Switching frequencies and harmonics containing these audible frequencies may produce noise that may be noticeable as humming, clicking, buzzing, and so forth, for instance. Similarly, if the electronic device plays video, it may be possible to visually detect some artifacts of the switching frequency in the video images or the lighting of the display that is displaying the video.

A commonly used technique to control the switching frequency of a voltage converter is to use pulse-width modulation (PWM) control. With PWM control, the switching frequency is known, therefore, the switching frequency may be set so that the switching frequency and its harmonics do not contain frequencies that may produce detectable noise. However, PWM control may require a relatively complex feedback control system to ensure converter stability, therefore incurring greater development and manufacturing costs.

SUMMARY OF THE INVENTION

These and other problems are generally solved or circumvented, and technical advantages are generally achieved, by embodiments of a system and a method for controlling a conversion frequency of a hysteretic mode voltage converter.

In accordance with an embodiment, a digital control loop for a switching converter is provided. The digital control loop includes a timing measure unit having a first input coupled to a reference clock and a second input coupled to a clock based on a switching of the switching of the converter, and an on time adjust unit coupled to the timing measure unit. The timing measure unit counts a number of clock ticks of a clock signal provided by the clock occurring during a period of time specified by a number of clock ticks of a reference clock signal provided by the reference clock, and the on time adjust unit adjusts an on time control signal based on the count of the number of clock ticks of the clock signal to alter a frequency of the switching.

In accordance with another embodiment, a switching converter is provided. The switching converter includes a first energy storing device coupled to a voltage input, a second energy storing device coupled to the first energy storing device, a switch coupled to the first energy storing device, and a switch timing control unit coupled to the switch. The switch selectively couples the first energy storing device to a power rail, and the switch timing control unit sets a state of the switch to couple and decouples the first energy storing device to the power rail, wherein the state of the switch is based on a desired switching frequency of the switching converter.

In accordance with another embodiment, a method for adjusting a switching frequency of a switching converter is provided. The method includes counting a number of state switches of a switch in the switching converter occurring within a specified time period, wherein the number of state switches is related to the switching frequency, decreasing the switching frequency in response to a determining that the count is greater than a first threshold, increasing the switching frequency in response to a determining that the count is less than a second threshold, and maintaining the switching frequency in response to a determining that the count is between the first threshold and the second threshold.

An advantage of an embodiment is that control of the switching frequency may be afforded. Furthermore, it may be possible to specify the precision of the control over the switching frequency. A single design may be used to provide loose control or tight control over the switching frequency by simply specifying a few control parameters and with no modifications to the design.

A further advantage of an embodiment is that the control over the switching frequency may be independent of manufacturing process, device aging, operating temperature, and so forth.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 1 is a high-level diagram of a switching converter;

FIGS. 2a and 2b are diagrams of a boost mode switching converter and a buck mode switching converter;

FIG. 2c is a diagram of a switch timing control unit;

FIG. 3a is a high-level diagram of a timing loop;

FIG. 3b is a diagram of a timing measure unit;

FIG. 3c is a diagram of an on time adjust unit;

FIG. 3d is a table of conditions and adjustments for a control signal; and

DETAILED DESCRIPTION OF ILLUSTRATIVE EMBODIMENTS

Figure 4A:
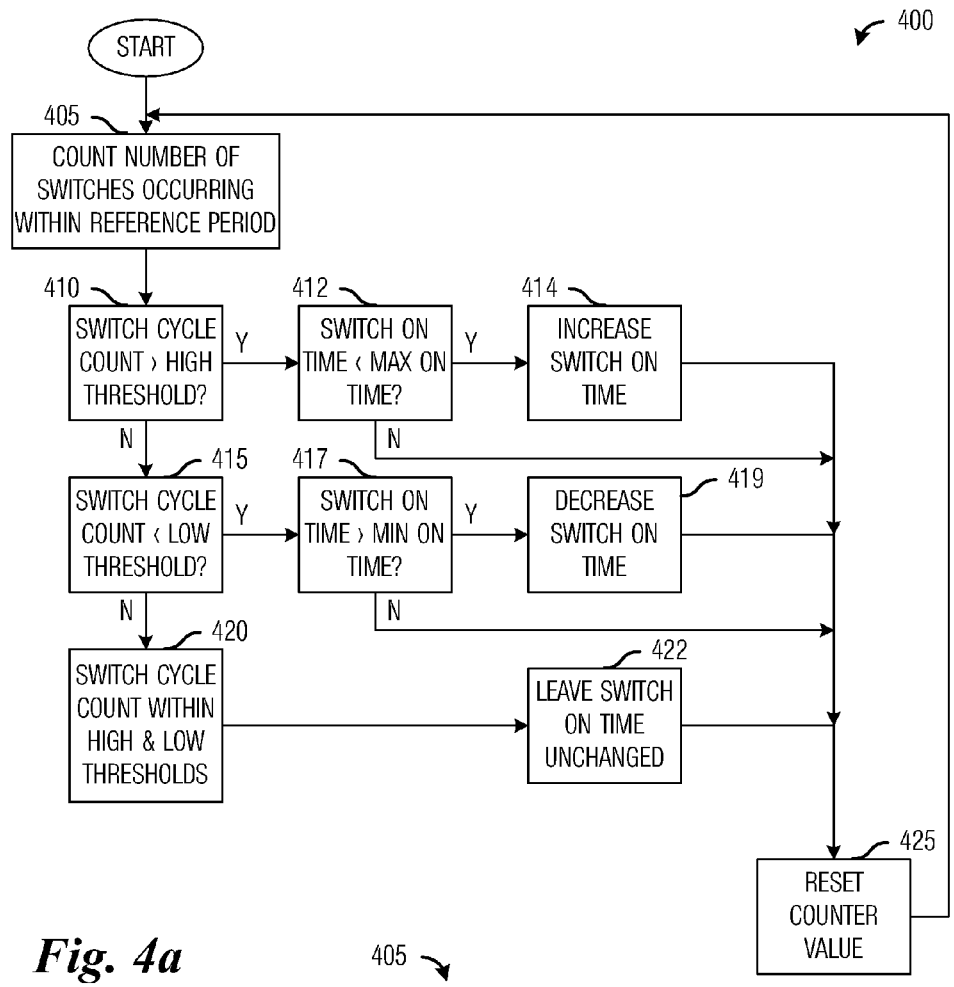
FIGS. 4a and 4b are diagrams of algorithms for adjusting a switching frequency of a switching mode converter.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a boost mode converter, with the boost mode converter being used to provide backlighting in a display application. The invention may also be applied, however, to other forms of converters, such as a buck mode converter, buck-boost mode converter, and so forth. The converters may be used in a wide range of applications wherein there is a need to convert voltages from a first potential level to a second potential level.

With reference now to FIG. 1, there is shown a diagram illustrating a high-level view of a converter 100. The converter 100 may have an input and an output. Coupled to the input of the converter 100 may be an input voltage "VIN." The input voltage may be at a given voltage potential. The converter 100 may then convert the input voltage to an output voltage "VOUT," wherein the output voltage may be at a different voltage potential than the input voltage.

FIG. 2a illustrates a high-level view of an exemplary boost mode converter 200. The boost mode converter 200 includes an energy storage device (e.g., an inductor) 205, a switch 210, a diode 215, and a capacitor 220. The switch 210 may couple/decouple the inductor 205 to electrical ground based on a control signal applied at its control terminal, with the control signal being provided by a switch timing control unit 225. When the switch 210 is closed, a current path may be created from the inductor 205 through the switch 210 to electrical ground. As the current flows through the inductor 205, the energy stored in the inductor 205 may be increased. When the switch 210 is opened, a current path may be created from the inductor 205 through the diode 215, the capacitor 220, and a load coupled to the output of the boost mode converter 200. The current flowing through the inductor 205 may transfer some of the energy stored in the inductor 205 to the capacitor 220.

The switch time control unit 225 may be used to determine the state of the switch 210. When the switch 210 is on, the switch 210 couples the inductor 205 to electrical ground and when the switch 210 is off, the switch 210 decouples the inductor 205 from electrical ground. The coupling and decoupling of the inductor 205 sets the voltage potential at the output of the boost mode converter 200. A ratio of the time when the switch 210 is on to when it is off may determine the voltage potential at the output of the boost mode converter 200. The switch time control unit 225 may provide a control signal to the control terminal of the switch 210 to determine the state of the switch 210. For example, if the switch 210 is a PMOS transistor, then to close the switch 210, the switch time control unit 225 may assert a logic high signal at a base terminal of the switch 210, causing the switch 210 to conduct. FIG. 2b illustrates a high-level view of an exemplary buck mode converter 230.

FIG. 2c illustrates a detailed view of the switch timing control unit 225. The switch timing control unit 225 includes a timing loop 250 that may be used to generate a control signal to regulate the switching frequency of switching mode converter, such as the boost mode converter 200. The timing loop 250 may be digital or analog in nature. A digital timing loop 250 may compare a reference clock signal with a desired frequency with the switching frequency of a switching mode converter. An analog timing loop 250 may make use of a phase-lock loop (PLL) to force the switching frequency of a switching mode converter to be substantially equal to a desired frequency. The following discussion will focus on a digital timing loop 250. However, an analog timing loop 250 should be readily evident to persons of ordinary skill in the art of the present invention and will not be discussed further herein.

The timing loop 250 may provide the control signal to an on time control unit 255. The control signal may be used by the on time control unit 255 to configure circuitry in the on time control unit 255. For example, the control signal from the timing loop 250 may determine a magnitude of a charging current used to charge a number of capacitors in the on time control unit 255 or the control signal may determine a number of capacitors in the on time control unit 255 to be charged. By changing the charging current or the number of charging capacitors, a duration of an on time control signal produced by the on time control unit 255 may be changed.

The on time control signal from the on time control unit 255 may then be provided to a converter logic unit 260, which may generate from the on time control signal, a switch control signal for a switch, such as the switch 210, of a switching mode converter. The switch control signal may be amplified by an amplifier 265 to a level compatible with the switch 210.

The switch timing control unit 225 also includes a comparator 270. The comparator 270 may be a hysteretic comparator to provide a hysteretic mode of operation for a switching mode converter. The comparator 270 may be used to compare a voltage level at a load coupled to an output of the switching mode converter to a voltage reference "VREF." An output of the comparator 270 may then be used to gate the switch control signal produced by the converter logic unit 260, so that the switching mode converter provides a current to the load only when the voltage level at the load is lower than the voltage reference, for example. The timing loop 250 may also provide a digital to analog control signal that may be provided to a variable resistor 275, which may be used for controlling load current. The variable resistor 275 may be controlled via register bits, with brightness changing with load current.

FIG. 3a illustrates a high-level view of the timing loop 250. The timing loop 250 may be logically partitioned into two units, a first unit being a timing measure unit 305 and a second unit being an on time adjust unit 310. The timing measure unit 305 may be used to measure a difference (if a difference exists) between a reference frequency (or some multiple or fraction thereof) and a switching frequency of a switching mode converter, such as the boost mode converter 200. The timing measure unit 305 may measure the difference and provide the measured difference to the on time adjust unit 310, which may generate a control signal based on the measured difference. The control signal may be used to adjust an on time of a switch, such as the switch 210, of the boost mode converter 200 so that the switching frequency of the boost mode converter 200 moves closer to the reference frequency or a multiple or fraction thereof.

FIG. 3b illustrates the timing measure unit 305 of the timing loop 250. The timing measure unit 305 includes a reference clock counter 315. The reference clock counter 315 may be an ordinary binary counter clocked by a reference clock signal, with the reference clock counter 315 counting a number of clock ticks of the reference clock signal. The reference clock signal should be of a known frequency and feature a high degree of accuracy, such as a clock signal provided by a crystal oscillator. A comparator 317 may be used to compare a count value in the reference clock counter 315 with a specified value. When the count value is equal to the specified value, the comparator 317 may assert a logic true value (or a logic false value) at its output. For example, if the reference clock signal has a known frequency of one MHz and the specified value is equal to one thousand (1000), then when the reference clock counter 315 reaches 1000 (or one milliseconds has elapsed), the comparator 317 will assert the logic true value at its output.

The logic true value asserted by the comparator 317 may be used to enable an output capture unit 319. When enabled, the output capture unit 319 may capture a value at its input and pass the captured value to its output. When not enabled, the output capture unit 319 may hold a previously captured value. The output capture unit 319 may be used to control the propagation of a count value of a clock counter 321. The clock counter 321 may be used to count a number of clock ticks of a clock signal used to clock the clock counter 321. Preferably, the clock signal is the switching frequency of the boost mode converter 200. The timing measure unit 305 may also include several clock domain convert units 323. The clock domain unit 323 includes a pair of serially coupled latches 324 and may be used to convert a signal clocked by a first clock signal into a signal clocked by a second clock signal.

Therefore, the timing measure unit 305 counts the number of times the boost mode converter 200 switches within a period of time, wherein the period of time is clocked by a highly accurate time source. If the number of times that the boost mode converter 200 switches is low, then the switching frequency may be lower than desired, while if the number of times that the boost mode converter 200 switches is high, then the switching frequency may be higher than desired. After the output capture unit 319 has captured the count value of the clock counter 321, the reference clock counter 315 and the clock counter 321 may be reset to repeat the count of the switching frequency of the boost mode converter 200.

FIG. 3c illustrates the on time adjust unit 310 of the timing loop 250. The on time adjust unit 310 includes a select logic unit 330. The select logic unit 330 may be used to select an adjustment for the control signal to the on time control unit 255 based on the count value of the clock counter 321 as well as a current value of the control signal. If the count value of the clock counter 321 is greater than a high threshold (meaning that the switching frequency of the boost mode converter 200 may be high), then the control signal should be adjusted so that the on time control signal switches on the switch 210 for a shorter period of time. This may be achieved by increasing the on time value of the control signal. However, this should only occur if the control signal has a value that is less than a maximum on time. Similarly, if the count value of the clock counter 321 is less than a low threshold (meaning that the switching frequency of the boost mode converter 200 may be low), then the control signal should be adjusted so that the on time control signal switches on the switch 210 for a longer period of time. This may be achieved by decreasing the on time value of the control signal. However, this should occur only if the control signal has a value that is greater than a minimum on time. If the count value of the clock counter 321 is greater than the low threshold but is less than the high threshold, then the control signal may not need to be adjusted. FIG. 3d illustrates a table of conditions used by the select logic unit 330 to adjust the control signal, where M may be an integer value corresponding to a coarseness of the adjustment to the control signal.

With reference back to FIG. 3c, the select logic unit 330 may be coupled to an adder 332. The adder 332 may combine the output of the select logic unit 330 with the current value of the control signal to create a new value of the control signal. For example, the adder 332 may create a new value of the control signal with a lower value when the output of the select logic unit 330 is less than zero, effectively subtracting the value from the control signal. An output capture unit 334 may be used to regulate the propagation of the control signal and may be controlled by a "CALCDONE" signal, which may be generated after the reference clock counter 315 has counted a requisite amount of reference clock ticks, signifying the passage of a desired amount of time. In general, the output capture unit 334 may operate in a manner similar to the output capture unit 319, capturing and storing a value at its input when enabled.

FIG. 4a illustrates an algorithm 400 for use in adjusting a switching frequency of a switching mode converter, such as the boost mode converter 200. The algorithm 400 may execute in a switch timing control unit, such as the switch timing control unit 225 of the boost mode converter 200. The algorithm 400 may be implemented in a custom designed integrated circuit specifically created to perform the switching frequency adjustment. Alternatively, the algorithm 400 may be implemented using discrete logic units and blocks. Furthermore, the algorithm 400 may be in the form of firmware or software executing on a microprocessor, a microcontroller, or so on.

The adjusting of the switching frequency may begin with a counting of a number of times the boost mode converter 200 switches within a reference time period, or simply, a switch cycle count (block 405). In general, from the switch cycle count, it may be possible to determine the switching frequency of the boost mode converter 200. For example, if the boost mode converter 200 switches 1000 times during a millisecond time period, then the switching frequency may be at about 1 MHz.

The switch cycle count may be used to determine if the switching frequency of the boost mode converter 200 is within an acceptable range, typically centered about a desired switching frequency. If the switch cycle count is greater than a high threshold, then the switching frequency may be too high (block 410). In order to compensate for a high switching frequency, it may be possible to increase the value of the on time control signal, since increasing the on time control signal may effectively increase a duration that the switch 210 is in an on state and thereby reducing the switching frequency. However, it may be necessary to ensure that the value of the on time control signal may be increased, i.e., the value is not already at its maximum value (block 412). If the value of the on time control signal is not already at its maximum value, then the value may be increased (block 414). For example, if the desired switching frequency is 1 MHz, the reference time period is one millisecond, then ideally, the switch cycle count should be about equal to 1000. However, if the high threshold is 1200 and the switch cycle count is 1350, then the boost mode converter 200 is switching too rapidly and the switching frequency should be decreased. After increasing the value of the on time control signal, the adjusting of the switching frequency may return to the counting of the switch cycle count to repeat the adjusting process.

If the switch cycle count is less than a low threshold, then the switching frequency may be too low (block 415). In order to compensate for a low switching frequency, it may be possible to decrease the value of the on time control signal, since decreasing the on time control signal may effectively decrease a duration that the switch 210 is in an on state and thereby increase the switching frequency. However, it may be necessary to ensure that the value of the on time control signal may be decreased, i.e., the value is not already at its minimum value (block 417). If the value of the on time control signal is not already at its minimum value, then the value may be decreased (block 419). For example, if the desired switching frequency is 1 MHz, the reference time period is one millisecond, the low threshold is 800, and if the switch cycle count is equal to 700, then the boost mode converter 200 is switching too slowly and the switching frequency should be increased. After decreasing the value of the on time control signal, the adjusting of the switching frequency may return to the counting of the switch cycle count to repeat the adjusting process, after the counter value is reset (block 425).

If the switch cycle count is less than the high threshold and more than the low threshold, then the switching frequency is within an acceptable range (block 420) and no adjustments to the on time control signal are required (block 422). After determining that there are no needed changes to the on time control signal, the adjusting of the switching frequency may return to the counting of the switch cycle count to repeat the adjusting process, after the counter value is reset (block 425).

The precision of the algorithm 400 may be modified by altering the different thresholds, as well as the duration of the reference period. For example, to force tight adherence to the desired switching frequency, the high threshold and the low threshold should be set close together. For example, referencing back to the example discussed above, tight conformance to the desired switching frequency may be achieved by setting the high threshold to 1050 and the low threshold to 950, while loose conformance may be achieved by setting the high threshold to 1500 and the low threshold to 500. Furthermore, the duration of the reference period may have an effect on the performance of the algorithm 400. If the duration of the reference period is short, then the switch cycle count may not be able to accumulate many switching cycles, making the significance of each switching cycle greater. Therefore, a missed switching cycle may have greater impact on any adjustments that may be made to the on time control signal.

Figure 4B:
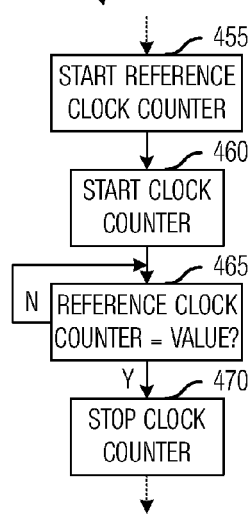

FIG. 4*b* illustrates a detailed view of an embodiment of the counting of a number of times the boost mode converter 200 switches within a reference time period (block 405), i.e., determining the switch cycle count. The determining of the switch cycle count may begin with a starting of a first counter that may be clocked by a reference clock signal (block 455). The reference clock signal should be provided by an accurate and reliable source, such as from a crystal oscillator. At about the same time that the counter for the reference clock signal is started, a second counter that may be clocked by a clock representative of the switching of the boost mode converter 200 may also be started (block 460).

As the first counter and the second counter are counting clock ticks of their respective clocks, a check to determine if the first counter has reached a specified value may be performed (block 465). If the first counter has not reached the specified value, the first counter and the second counter may be permitted to continue. If the first counter has reached the specified value, then the second counter may be stopped (block 470) and its count value may be used to determine the switching frequency of the boost mode converter 200 and to make any needed adjustments to the switching frequency of the boost mode converter 200.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A digital control loop for a switching converter, the digital control loop comprising:
   a timing measure unit having a first input coupled to a reference clock and a second input coupled to a first clock based on a switching of the switching of the converter, the timing measure unit to count a number of clock ticks of a clock signal provided by the first clock occurring during a period of time specified by a number of clock ticks of a reference clock signal provided by the reference clock; and
   an on time adjust unit coupled to the timing measure unit, the on time adjust unit to adjust an on time control signal based on the count of the number of clock ticks of the first clock signal to alter a frequency of the switching.

2. The digital control loop of claim 1, wherein the timing measure unit comprises:
   a reference counter coupled to the reference clock, the reference counter to count clock ticks in the reference clock signal;
   a comparator coupled to the reference counter, the comparator to compare the count of the reference counter against a specified value;
   a clock counter coupled to the first clock, the clock counter to count clock ticks in the first clock signal; and
   a capture circuit coupled to an output of the comparator and to the clock counter, the capture circuit to store the count of the first clock counter.

3. The digital control loop of claim 2, wherein the reference clock signal is provided by a high precision clock source.

4. The digital control loop of claim 1, wherein the on time adjust unit comprises:
   a logic block configured to produce at an output an adjustment to the on time control signal based on the count of clock ticks of the first clock signal; and
   an adder coupled to the output of the logic block and an output of the on time adjust unit, the adder to combine the adjustment to the on time control signal and a current value of the on time control signal into a new value of the on time control signal.

5. The digital control loop of claim 4, wherein the adjustment to the on time control signal is further based on the current value of the on time control signal.

6. The digital control loop of claim 4, wherein the adjustment to the on time control signal either increases or decreases the frequency of the switching.

7. The digital control loop of claim 1, wherein the clock signal in an output of a comparator comparing a voltage drop across a load of the switching converter and a reference voltage.

8. The digital control loop of claim 7, wherein the comparator is a hysteretic comparator.

9. A switching converter comprising:
   a first energy storing device coupled to a voltage input;
   a second energy storing device coupled to the first energy storing device;
   a switch coupled to the first energy storing device, the switch to selectively couple the first energy storing device to a power rail; and
   a switch timing control unit coupled to the switch, the switch timing control unit configured to set a state of the switch to couple and decouple the first energy storing device to the power rail, wherein the state of the switch is based on a desired switching frequency of the switching converter, wherein the switch timing control unit comprises:
   a hysteretic comparator having a first input coupled to a voltage reference and a second input coupled to a load coupled to the switching converter, the hysteretic comparator to produce a signal at an output based on a relationship between voltage levels of signals at the first input and the second input;
   a timing loop having a first input coupled to a reference clock and a second input coupled to an output of the hysteretic comparator, the timing loop configured to determine a switching frequency of the switch changing state and to produce a control signal to set the switching frequency to be substantially equal to the desired switching frequency; and
   a logic unit coupled to the timing loop and to the switch, the logic unit configured to generate a signal to set a state of the switch based on the control signal.

10. The switching converter of claim 9, wherein the switch timing control unit further comprises an on time control unit coupled in between the timing loop and the logic unit, the switch timing control unit configured to alter a charging current or a number of charging capacitors based on the control signal.

11. The switching converter of claim 9, wherein the timing loop comprises:
    a timing measure unit having a first input coupled to the reference clock and a second input coupled to the output of the hysteretic comparator, the timing measure unit to count a number of clock ticks of a signal provided by the output of the hysteretic comparator occurring during a period of time specified by a number of clock ticks of a reference clock signal provided by the reference clock; and
    an on time adjust unit coupled to the timing measure unit, the on time adjust unit to adjust an on time control signal based on the count of the number of clock ticks of the clock signal to alter a frequency of the switching.

12. The switching converter of claim 11, wherein the reference clock signal has a frequency that is greater than the desired switching frequency.

13. The switching converter of claim 9, wherein the switch couples the first energy storing device to electrical ground and the switching converter is a boost mode switching converter.

14. The switching converter of claim 9, wherein the switch couples the first energy storing device to the voltage input and the switching converter is a buck mode switching converter.

15. A method for adjusting a switching frequency of a switching converter, the method comprising:
    counting a number of state switches of a switch in the switching converter occurring within a specified time period, wherein the number of state switches is related to the switching frequency;
    decreasing the switching frequency in response to a determining that the count is greater than a first threshold;
    increasing the switching frequency in response to a determining that the count is less than a second threshold; and
    maintaining the switching frequency in response to a determining that the count is between the first threshold and the second threshold.

16. The method of claim 15, wherein the counting comprises:
    starting a reference clock counter to count a number of clock ticks of a reference clock;
    starting a switch counter to count the number of state switches; and
    stopping the switch counter in response to a determining that the count of clock ticks of the reference clock is equal to a specified value.

17. The method of claim 15, wherein the decreasing comprises increasing a value of a control signal used to specify the switching frequency in response to a determining that the value is less than a high value threshold.

18. The method of claim 15, wherein the increasing comprises decreasing a value of a control signal used to specify the switching frequency in response to a determining that the value is greater than a low value threshold.

19. The method of claim 15, wherein the first threshold and the second threshold span a count of the number of switches when the switch is switching at a desired switching frequency.

* * * * *